US012735265B2

(12) United States Patent
Beuchert et al.

(10) Patent No.: US 12,735,265 B2
(45) Date of Patent: Sep. 15, 2026

(54) BRAKE SHOE

(71) Applicant: Caljan A/S, Hasselager (DK)

(72) Inventors: Karsten Beuchert, Hedensted (DK); Anders Ørgaard Kloster, Skødstrup (DK)

(73) Assignee: Caljan A/S, Hasselager (DK)

( * ) Notice: Subject to any disclaimer, the term of this patent is extended or adjusted under 35 U.S.C. 154(b) by 51 days.

(21) Appl. No.: 18/819,215

(22) Filed: Aug. 29, 2024

(65) Prior Publication Data

US 2025/0074710 A1 Mar. 6, 2025

(30) Foreign Application Priority Data

Sep. 1, 2023 (DK) .......................... PA 2023 70455

(51) Int. Cl.

| | |
|---|---|
| ***B65G 21/14*** | (2006.01) |
| ***B65G 21/06*** | (2006.01) |
| ***F16B 2/06*** | (2006.01) |
| ***F16D 63/00*** | (2006.01) |
| ***F16D 65/18*** | (2006.01) |
| ***G08B 3/10*** | (2006.01) |

(52) U.S. Cl.

CPC ............ *B65G 21/14* (2013.01); *B65G 21/06* (2013.01); *F16B 2/065* (2013.01); *F16D 63/008* (2013.01); *G08B 3/10* (2013.01); *B65G 2207/08* (2013.01); *F16D 65/18* (2013.01)

(58) Field of Classification Search

CPC .... B65G 2207/08; B65G 21/14; B65G 21/06; F16B 2/065; G08B 3/10; F16D 63/008; F16D 65/18; F16D 2066/005

See application file for complete search history.

(56) References Cited

U.S. PATENT DOCUMENTS 2,721,645 A * 10/1955 Eberle .................... B65G 13/12 198/530
4,627,591 A * 12/1986 Heckmann ................ F16B 7/14 248/188.5

(Continued)

FOREIGN PATENT DOCUMENTS

| | | |
|---|---|---|
| CN | 106 312 634 A | 1/2017 |
| CN | 207 358 616 U | 5/2018 |
| CN | 209038889 U | 6/2019 |

(Continued)

OTHER PUBLICATIONS

European Search Report for Application No. 24 19 7534, issued on Dec. 27, 2024.

(Continued)

*Primary Examiner* — James R Bidwell

(74) *Attorney, Agent, or Firm* — Schmeiser Olsen PLLC

(57) ABSTRACT

A brake shoe is provided including two engagement bodies, where the engagement bodies are connected by a threaded axle, such that by rotating the threaded axle in a first direction around a rotation axis parallel to the axle, the engagement bodies are urged towards each other, and by rotating the axle in a second direction different from the first direction, the engagement bodies are urged away from each other, and where at least one guide axle is provided parallel to the threaded axle, where the two engagement bodies may slide freely along the at least one guide axle, and further where an attachment is provided for attaching the brake shoe to a construction.

11 Claims, 3 Drawing Sheets

(56) References Cited

U.S. PATENT DOCUMENTS

| | | | | |
|---|---|---|---|---|
| 11,666,997 | B1 | 6/2023 | Richard, V | |
| 2011/0229064 | A1* | 9/2011 | Gluck | F16C 29/10 384/26 |

FOREIGN PATENT DOCUMENTS

| | | | | |
|---|---|---|---|---|
| CN | 210710389 | U | 6/2020 | |
| CN | 213 351 624 | U | 6/2021 | |
| CN | 113202890 | A | 8/2021 | |
| CN | 218619949 | U | 3/2023 | |
| EP | 0976943 | A1 * | 2/2000 | B66D 5/08 |

OTHER PUBLICATIONS

Danish Search Report for Application No. PA 2023 70455, completed on Feb. 26, 2024.

* cited by examiner

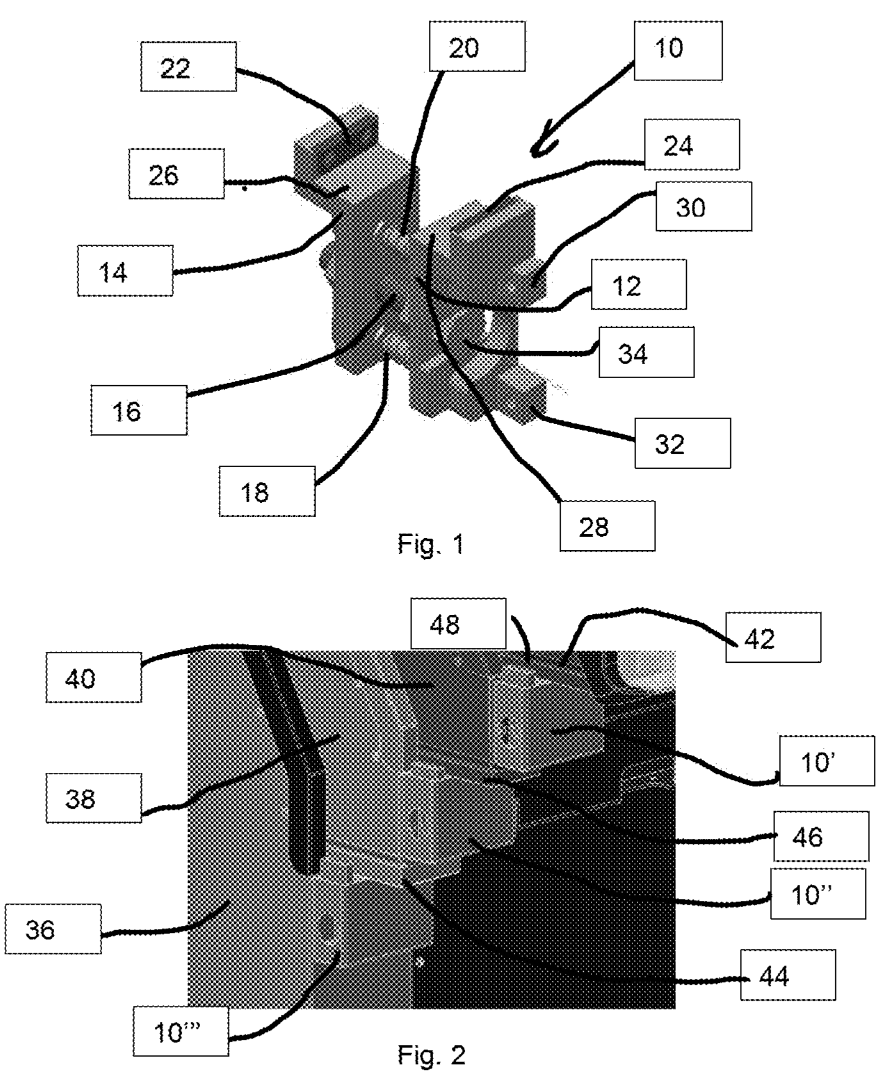
Fig. 1
Fig. 2
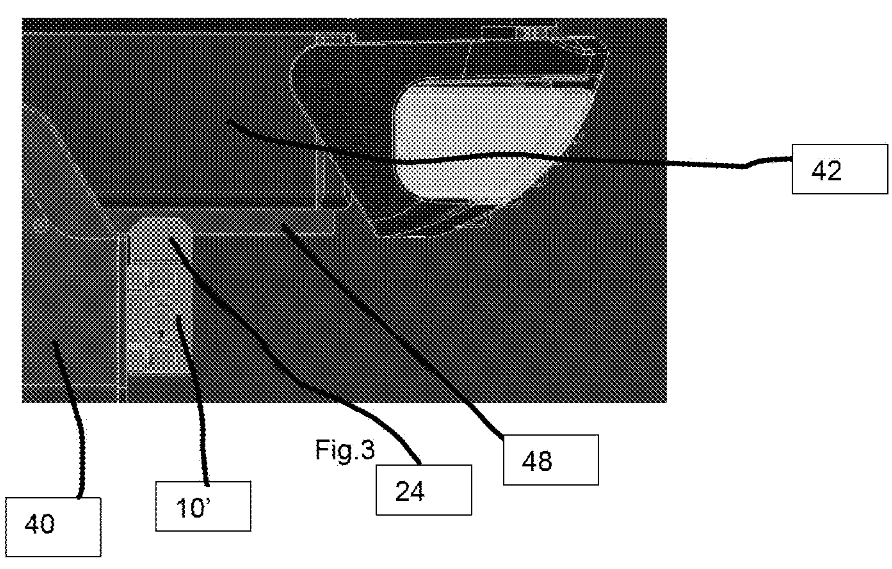
Fig.3

BRAKE SHOE

CROSS-REFERENCE TO RELATED APPLICATIONS

This application claims priority to Danish Application No. PA 2023 70455, having a filing date of Sep. 1, 2023, the entire contents which are hereby incorporated by reference.

FIELD OF TECHNOLOGY

The following relates to a brake shoe comprising two engagement bodies. Furthermore, the following relates to an extendable conveyor construction comprising a main frame and the extendable conveyor construction having two or more extendable sections where a brake shoe according to embodiments of the invention is arranged on the main frame in order to avoid that the two or more extendable sections may be moved when the brake shoe is engaged.

BACKGROUND

In a number of machine-constructions the machine comprises parts which may be movable or extendable. These movable or extendable parts are usually controlled by a central control unit where means are incorporated such that the extendable part may be arrested in a desired position. These means for arresting the extendable/movable part may for example be stopping of an electric motor whereby a spindle or a drive belt is hindering from further motion/rotation thereby avoiding that the extendable/movable part may move any further. Likewise, in hydraulic devices the hydraulic pump may be stopped in a given position whereby actuators or the like will not be able to move further. These types of stops usually function very well during normal circumstances when there are no faults in the system, but in certain circumstances these systems may fail. Usually during such situations of failure, the consequences are not very grave, but in cases where for example service or maintenance work is carried out on the machine on which the movable or extendable parts are present, a person servicing the machine may unintentionally come into a situation where the movement of the extendable/movable part may cause severe danger and even injury.

Consequently, it is an aspect of embodiments of the present invention to provide a simple and yet safe device which particularly in situations where the already installed systems may fail, will make sure that the movable/extendable parts are not able to move, thereby providing the added level of security for any person servicing, repairing or maintaining the apparatus in areas of the apparatus where the movable part may be present during operation.

SUMMARY

An aspect relates to a brake shoe comprising two engagement bodies, where the engagement bodies are connected by a threaded axle, such that by rotating the threaded axle in a first direction around a rotation axis parallel to the axle, the engagement bodies are urged towards each other, and by rotating the axle in a second direction different from the first direction, the engagement bodies are urged away from each other, and where at least one guide axle is provided parallel to the threaded axle, where the two engagement bodies may slide freely along the at least one guide axle, and further where means are or an attachment are provided for attaching the brake shoe to a construction.

By attaching a brake shoe, as disclosed above in the vicinity and in a position where the engagement by the engagement bodies may be brought into engagement with the movable part it is possible to in a mechanical way to fix any movable/extendable member of the apparatus. The fact that it is a mechanical construction which relies on a threaded axle to be rotated for example manually provides the added security that the personnel desiring to carry out maintenance or repair work on the apparatus before proceeding with such work will manually fasten/tighten all the brake shoes thereby ensuring that the movable parts of the apparatus are fixed.

In an embodiment of the invention a strain gauge is mounted on the threaded axle, and where the strain gauge is connected to a control box, which control box may be preprogrammed to indicate the tension in the bolt as a result of the input from the strain gauge when tensioning the threaded axle, the strain gauge will register attention in the traded axel, which for example will be made from seal an communicate attention to the control box. By pre-programming the control box to a signal, the tension in the threaded axle, for example indicating when a pre-programmed tension in the bolt/threaded axle is achieved, it is assured that the engagement bodies of the brake shoe is forced against the movable or extendable part of the machine with the desire to clamping action assuring that the movable or extendable member may not be moved.

The indication of the tension may as disclosed in an embodiment of the invention be such that the tension of the threaded axel/bolt may be illustrated on a scale, the scale comprising a first part where the tension is below a certain threshold and a second part where the tension is above a certain threshold, and a part between the first and second parts indicating a desired tension.

For the people manually rotating the threaded axel it is relatively simple to read the indication from the scale and ascertain that the desired tension is achieved in the threaded axle whereby the desired clamping action of the engagement body surrounding part of the movable part is achieved. Also, by not over attentioning the threaded axle it is assured that when the threaded axle it is assured that when the threaded axle for example is manufactured from steel, is not damaged but is still within the boundaries of accepted tension.

In an embodiment of the invention the control box comprises an audible alarm, which alarm is triggered in response to input from the stain gauge, where the input corresponds to a desired tension.

With this embodiment an alternative or supplement to the scale as discussed above is provided in the shape of for example an audible alarm such that when the desired tension is achieved an alarm is generated clearly indicating that no further tensioning of the threaded axel should be carried out.

In an embodiment of the invention the threaded axle in a first end is provided with a head portion, such that a tool in use may engage the head portion and rotate the threaded axle and thereby apply or reduce a torque to the threaded axle. In this manner it becomes quite easy to apply the torque to the threaded axel, for example by standard wrench or the like. In an embodiment, the tool itself is integrated as an integrated part of the brake shoe and may be operated to rotate by manipulating the input means, for example arranged on the control box. And naturally means for indicating the achieved attention should be provided such that the threaded axle is not damaged. In instances where the tool is integrated into the brake shoe, input means may be pre-programmed to apply the desired torque to the threaded axle such that the desired tension is reached automatically.

In certain instances, particularly where for example a rail is present in movable part, the engagement body comprises brake pads mounted on each engagement body, such that the brake pads face each other, and that orthogonal to and in use, below the brake pads, a guide surface is provided on each engagement body. The guide surface may be arranged on the rail such that the engagement bodies are positioned in a position where they will engage the rail, whereby be able to transmit the braking force to the movable part. Such rails are typically present in extendable conveyors, hydraulic arms etc.

In a still further advantageous embodiment an upper guide axle is provided in use arranged over the threaded axle, and where a sensor mechanism is provided below the threaded axle, the sensor mechanism comprising a resilient spring arranged between the two engagement bodies urging the engagement bodies away from each other, an induction or proximity sensor arranged on one engagement body and an adjustable counterpart arranged on the other engagement body, such that the distance may be preset between the induction or proximity sensor and the counterpart.

As is the case in the other embodiments above the threaded axle or bolt is used to tighten the engagement bodies around the object to be held fixed—for example a rail. In order to ascertain that a correct tension is achieved, i.e., the engagement bodies, and in particular the brake pads are in braking engagement with the rail, the inductive sensor or proximity sensor, may be adjusted to indicate the desired tension. As the threaded axle is rotated inducing tension in the bolt, the engagement bodies are urged together. The engagement bodies may tilt relative to the threaded axle, such that the brake pads move perpendicular relative to the object they are intended to clamp. The resilient spring will however urge the upper part of the engagement bodies towards each other, by causing a slight tilt around the threaded axle. As the threaded bolt is tightened the engagement bodies will move towards each other and clamp the object (rail) arranged between the engagement bodies. At the same time the engagement bodies will tilt back, and the induction/proximity sensor will be activated, registering the distance between the two engagement bodies. As a predetermined distance is registered a signal is generated and transferred to a control box, where an alarm or other indication may be generated indicating that the predetermined tension (and thereby brake power) has been obtained.

The predetermined tension may be adjusted by moving the counterpart closer or further away from the induction/proximity sensor.

In an embodiment, the threaded axle is a bolt with a built-in tension indicator, where the indicator is visible in the head portion of the bolt, and the indicator is arranged inside the bolt connected to the distal end opposite the head portion, such that as the bolt is tensioned the indicator will visibly indicate when a desired tension is achieved. An example of such a bolt is available from for example www.boltsmarter.com. The bolts may be dimensioned and selected to indicate selected desired tensions according to the purpose. Typically, the indicator will change color, such that when tensioning the bolt, it is easy to register when the bolt has been tightened to the desired torque (corresponding to a desired tension in the bolt).

Although the brake shoe as discussed above may be applied in a number of applications having movable or extendable parts, embodiments of the invention are specifically directed to an extendable conveyor construction comprising a main frame and two or more extendable sections, where each extendable section has one or more lower slide rails, sliding on bearings when the section is being extended or withdrawn, and where a brake shoe according to any of claims 1 to 8 is mounted adjacent one or more of the slide rails on at least one section, such that the brake shoe may be operated to allow the engagement sections to engage and arrest the slide rail, or release the slide rail.

In embodiments of the extendable conveyor, the brake shoe is mounted on the main frame such the guide surfaces engage the slide rail. By using the main frame as the anchor, a solid braking force may be applied whereby the risk of movement is mitigated and the obstruction of powers, for example from the potential movement of the extendable conveyor is absorbed by the main frame.

Furthermore, embodiments of the invention are also directed to a method of arresting an extendable section comprising a slide rail, by arranging a brake shoe, such that the guide surfaces of the brake shoe engage the slide rail, and rotating the axle thereby urging the engagement bodies towards each other, whereby the engagement bodies engage the slide rail, and continue rotating the axle until a strain gauge arranged on the axle indicates that a desired tension is achieved in the axle.

BRIEF DESCRIPTION

Some of the embodiments will be described in detail, with references to the following Figures, wherein like designations denote like members, wherein:

FIG. 1 illustrates a brake shoe construction;

FIG. 2 illustrates a perspective view of the extendable conveyor sections provided with a brake shoe construction;

FIG. 3 illustrates a side view of an extendable conveyor construction comprising a brake shoe;

DETAILED DESCRIPTION

Figure 4:
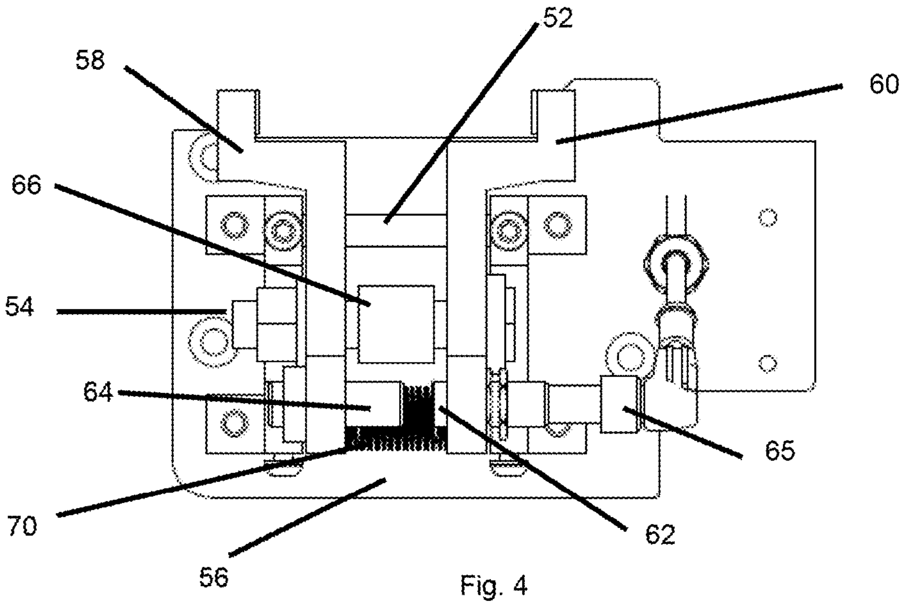
FIG. 4 illustrates a further brake shoe construction.

In FIG. 1 is illustrated an example of a brake shoe according to embodiments of the invention. The brake shoe 10 generally comprises two engagement bodies 12, 14 where the engagement bodies 12, 14 are connected by a threaded axle 16. The engagement bodies 12, 14 are provided with threads in the apertures through which apertures the threaded axle 16 passes such that by rotating the threaded axel 16, the engagement bodies 12, 14 will be urged towards each other or away from each other, depending on the rotation direction of the threaded axle 16. In this embodiment further two guide axles 18, 20 are provided. The guide axles 18, 20 are provided in order to assure that the movement of the engagement bodies 12, 14 is substantially linear along the axles of the threaded axle. Furthermore, the guide axles 18, 20 are in this embodiment provided with helical springs which will urge the engagement bodies 12, 14 apart. This in order to ensure that the brake pads release the object on which they have been engaged when the threaded axle is rotated such that the engagement bodies are urged apart.

Each engagement body 12, 14 is provided with brake pads 22, 24 arranged on upper opposing flanges, such that when the brake shoe is arranged around the movable member as will be explained below with reference to FIGS. 2 and 3, the brake pads 22, 24 may, by rotating the threaded axle be brought into contact with the movable member. Furthermore, each engagement body 12, 14, is provided with guide surfaces 26, 28. These guide surfaces 26, 28 are arranged below the brake pads 22, 24 such that, as will be explained below with reference to FIGS. 2 and 3, the brake shoe is positioned in engagement with the movable member, the guide surfaces will engage the underside of the movable member assuring that the brake shoe is in its correct position.

Furthermore, the brake shoe 10 is provided with lugs 30, 32 on each engagement body. In FIG. 1 only the lugs 30, 32 are visible on the right-hand side engagement body 12.

In an embodiment the threaded axle 16 is in the shape of a bolt provided with a hexagonal head section 34. The head section 34 may be engaged by a regular wrench, thereby rotating the threaded axle 16 bringing the two engagement bodies and the brake pads 22, 24 into contact with the movable member which it is desirable to arrest.

Not illustrated in FIG. 1 is the provision of a strain gauge connected to a control box. However, by arranging a strain gauge on the threaded axle 16, the tension rising in the threaded axle 16, as the engagement bodies engages and clamps the slidable or movable member which it is desirable to brake, the tension mov increase, thereby creating input from the strain gauge which may be transmitted to the control box for further processing.

Returning to the lugs, 30, 32, these are provided in order to be able to bolt the brake shoe 10 on to the machine/apparatus on which it is desirable to arrest a movable member. Typically, the brake shoe 10 will be bolted directly onto the main frame of the apparatus in order to assure that any force arising from movement of the movable/slidable part of the machine is transferred to the strongest part of the apparatus.

In FIG. 2 is illustrated an extendable conveyor construction comprising a main frame 36 and three extendable conveyor sections 38, 40, 42. Each conveyor section 38, 40, 42 is provided with a slide rail 44, 46, 48. Adjacent each of the slide rails is arranged a brake shoe according to embodiments of the invention as explained above. The brake shoes are encapsulated in a housing such that each brake shoe is mounted on an upper part of the extendable conveyor section below, where only the upper flanges with the brake pads 22, 24 extends up and may engage the slide rails 44, 46, 48. The lowermost brake shoe 10''' is arranged on the main frame 36 such that the brake pads may engage the slide rail 44. In order to activate the brake shoe an aperture is provided in the housing such that the head 34 (see FIG. 1) may be accessed through the aperture in order to activate the brake shoe. Similar arrangements are provided for the other brake shoes 10'' and 10'. Consequently, when desiring to carry out maintenance or repair work on the extendable conveyor construction as illustrated in FIG. 2, all the brake shoes 10', 10'' and 10''' should be tensioned to the desired tension whereby the brake pads 22, 24 are gripping an engaging the guide rails 44, 46, 48 in such a manner that the extendable members 38, 40, 42 are not able to move relative to each other. After repair work has finished, the brake shoes may be released by counter rotating the bolt 34 thereby taking the tension out of the threaded axles 16 as explained above.

Turning to FIG. 3 a closer and detail of the brake shoe arrangements between the movable sections 40 and 42 is illustrated. The upper movable section 42 is extended a little bit relative to the lower section 40. The brake shoe 10' has been activated by assuring that the brake pads 24 are engaging the guide rails 48. In this manner no relative movement is possible between the upper section 42 and the lower section 40 due to the engagement by the brake pads 24 which has been engaged by rotating the threaded axel (see FIG. 1) until they desired tension has been achieved whereby this assured that a solid grip is obtained between the brake pads 24 and the guide rail 48.

Figure 5:
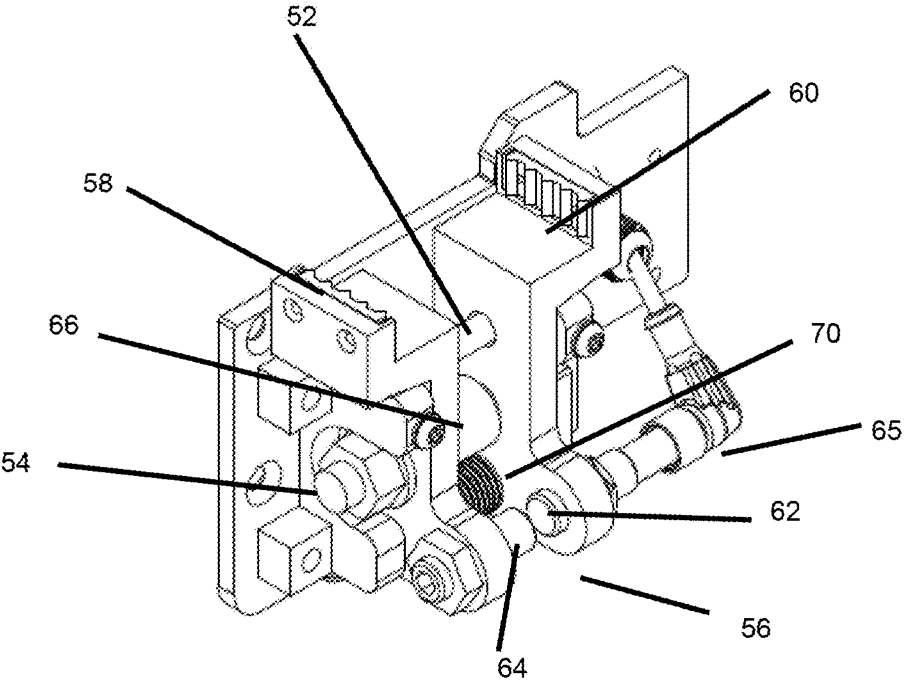
FIG. 5 illustrates a further brake shoe construction.

FIGS. 4 and 5 illustrates a further brake shoe construction. In this embodiment only an upper guide axle 52 is provided. The upper axle 52 is in use arranged above the threaded axle 54. In this embodiment the threaded axle is a bolt 54. A sensor mechanism 56 is provided below the threaded axle 54. The sensor mechanism 56 comprises a resilient spring 70 arranged between the two engagement bodies 58, 60 urging the engagement bodies 58, 60 away from each other. In this embodiment the resilient spring is in the shape of plate springs, but other types of springs such as for example helical springs may be used. An induction or proximity sensor 62 is arranged on one of the engagement bodies 58 and an adjustable counterpart 64 is arranged on the other engagement body 60. By adjusting the distance between the counterpart 64 and the sensor 62 it is possible to determine a preset reading for the proximity sensor 62 which will result in a desired tension. As the bolt 54 is rotated to create the braking tension, the torque necessary to obtain this tension may also be a determining parameter.

The sensor 62 is connected to a control box (not illustrated) by suitable cabling 65.

In the illustrated example a bushing 66 is arranged between the engagement bodies 58, 60 around the threaded axle 54. The bushing assures that the engagement bodies do not come too close, which may cause the counterpart 64 to engage and possibly damage the sensor 62.

In use the two engagement bodies 58, 60 when not engaging for example a rail on an extendable conveyor section will tilt, such that the brake pads 22, 24 (see FIG. 1) will be urged towards each other. This tilt is facilitated by the spring 70. As the bolt 54 is tightened, the brake pads will engage the member they are supposed to fixate—for example a rail on an extendable conveyor. As the brake pads 22, 24 engage the rail, the engagement bodies 58, 60 will rotate back to a substantially parallel position, whereby the proximity sensor 62 and the counterpart 64 will move linearly towards each other. As the tension in the bolt increases the sensor 62 and the counterpart 64 will move towards each other. At a certain tension the sensor 62 and the counterpart 64 has a mutual distance indicating that the desired tension (brake power) is reached and the sensor (and control box) will be able to indicate this state.

Figure 6:
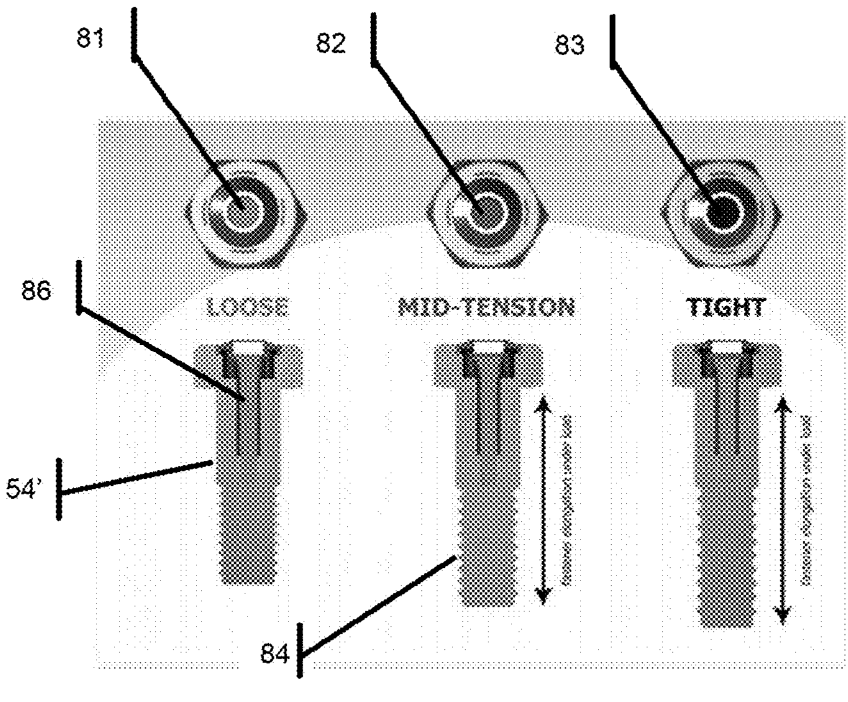
FIG. 6 illustrates an example of a Smartbolt® which may be used with embodiments of the present invention.

In FIG. 6 is illustrated an example of a Smartbolt® 54' which may be used with embodiments of the present invention. The Smartbolt® 54 comprise an inner insert 86 which is integral with the bolt body as such. As the bolt is exposed to tension due to the threaded part 84 engaging a counter-thread, whereby tension is created in the bolt body and thereby in the insert 86. The top of the insert is provided with an indicator 81, 82, 83. As the tension rises in the bolt 54' the insert 86 is pulled longer. This causes the indicator 81, 82, 83 to change color. By dimensioning the insert correctly, it is possible to provide a Smartbolt® which will change color when a desired tension is achieved. In FIG. 6 the color changes from light gray to black. In reality the color changes from red to black-providing a clear indication that the desired tension and thereby clamping force has been attained. The tension will be directly corresponding to the force the brake pads will exert on the object to be arrested—for example a rail in an extendable conveyor construction.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A brake shoe comprising: two engagement bodies, where the two engagement bodies are connected by a threaded axle or a bolt, such that by rotating the threaded axle or the bolt in a first direction around a rotation axis parallel to the threaded axle, the two engagement bodies are urged towards each other, and by rotating the threaded axle or the bolt in a second direction different from the first direction, the two engagement bodies are urged away from each other, and where at least one guide axle is provided parallel to the threaded axle or bolt, where the two engagement bodies slide freely along the at least one guide axle, and further where an attachment or means are provided for attaching the brake shoe to a construction and further where a tension in the bolt or the threaded axle is illustrated on a scale, the scale comprising a first part where the tension is below a certain threshold and a second part where the tension is above a certain threshold, and a part between the first and second parts indicating a desired tension.

2. The brake shoe according to claim 1, wherein a strain gauge is mounted on the threaded axle, and where the strain gauge is connected to a control box, which control box may be preprogrammed to indicate the tension in the bolt as a result of the input from the strain gauge.

3. The brake shoe according to claim 2, wherein the tension in the bolt may be illustrated on a scale, the scale comprising a first part where the tension is below a certain threshold and a second part where the tension is above a certain threshold, and a part between the first and second parts indicating a desired tension.

4. The brake shoe according to claim 2, wherein the control box comprises an audible alarm, which alarm is triggered in response to input from the stain gauge, where the input corresponds to a desired tension.

5. The brake shoe according to claim 1, wherein the threaded axle in a first end is provided with a head portion, such that a tool in use may engage the head portion and rotate the threaded axle and thereby apply or reduce a torque to the threaded axle.

6. The brake shoe according to claim 5, wherein the tool is an integrated part of the brake shoe and where the tool may be operated to rotate the threaded axle by manipulating input means.

7. The brake shoe according to claim 6, wherein the input means may be pre-programmed to apply a desired torque to the threaded axle.

8. The brake shoe according to claim 1, wherein the two engagement bodies comprise brake pads, mounted on each engagement body, such that the brake pads face each other, and that orthogonal to and in use below the brake pads, a guide surface is provided on each engagement body.

9. The brake shoe according to claim 1, wherein an upper guide axle is provided in use arranged over the threaded axle, and where a sensor mechanism is provided below the threaded axle, the sensor mechanism comprising a resilient spring arranged between the two engagement bodies urging the two engagement bodies away from each other, an induction or proximity sensor arranged on one engagement body and an adjustable counterpart arranged on the other engagement body, such that the distance may be preset between the induction or proximity sensor and the counterpart.

10. The brake shoe according to claim 1, wherein the threaded axle is a bolt with a built-in tension indicator, where the indicator is visible in the head portion of the bolt, and the indicator is arranged inside the bolt connected to the distal end opposite the head portion, such that as the bolt is tensioned the indicator will visibly indicate when a desired tension is achieved.

11. A method of arresting an extendable section comprising a slide rail, by arranging the brake shoe according to claim 1, such that the guide surfaces of the brake shoe engage the slide rail, and rotating the threaded axle thereby urging the two engagement bodies towards each other, whereby the two engagement bodies engage the slide rail and continue rotating the threaded axle until a strain gauge arranged on the threaded axle indicates that a desired tension is achieved in the threaded axle.

* * * * *